Jan. 6, 1925.

A. SALUCCI

CULINARY UTENSIL

Filed May 17, 1924

1,522,329

INVENTOR
Antonio Salucci.
BY
ATTORNEY

Patented Jan. 6, 1925.

1,522,329

UNITED STATES PATENT OFFICE.

ANTONIO SALUCCI, OF SALTSBURG, PENNSYLVANIA.

CULINARY UTENSIL.

Application filed May 17, 1924. Serial No. 713,876.

*To all whom it may concern:*

Be it known that I, ANTONIO SALUCCI, citizen of the United States, residing at Saltsburg, in the county of Indiana and State of Pennsylvania, have invented certain new and useful Improvements in Culinary Utensils, of which the following is a specification.

This invention relates generally to culinary utensils, having more particular reference to a novel type of pan for roasting or frying food such as meats, the invention having for an object to provide a novel pan of this sort which is arranged to permit of cooking of several different articles therein at the same time, a further object relating to the provision of a novel form of collapsible handle.

For further comprehension of the invention, and of the objects and advantages thereof, reference will be had to the following description and accompanying drawing, and to the appended claims in which the various novel features of the invention are more particularly set forth.

Fig. 1 of the drawing is a plan view showing my improved pan.

Figure 1:
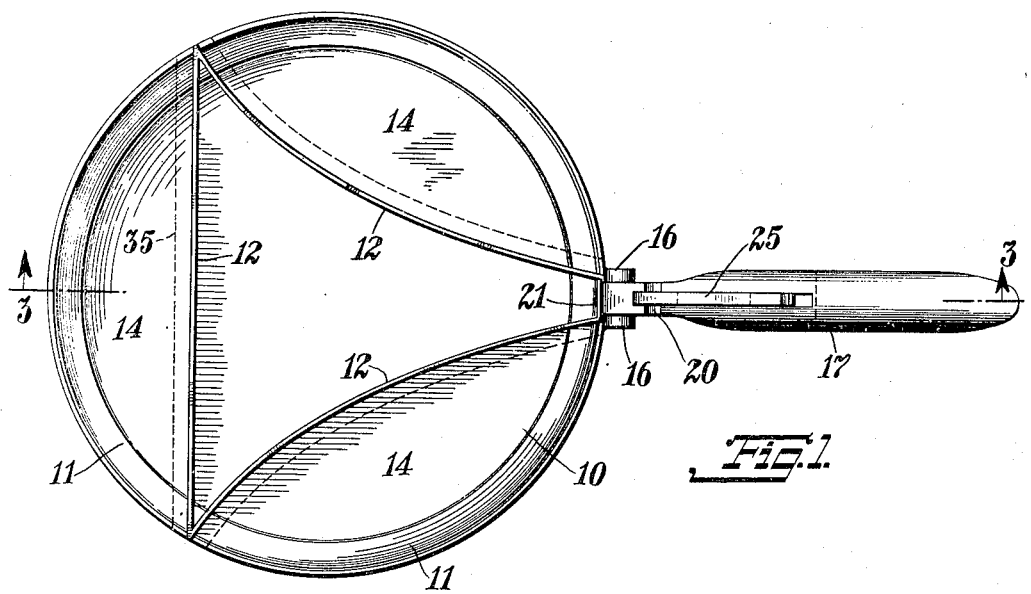
Figure 2:
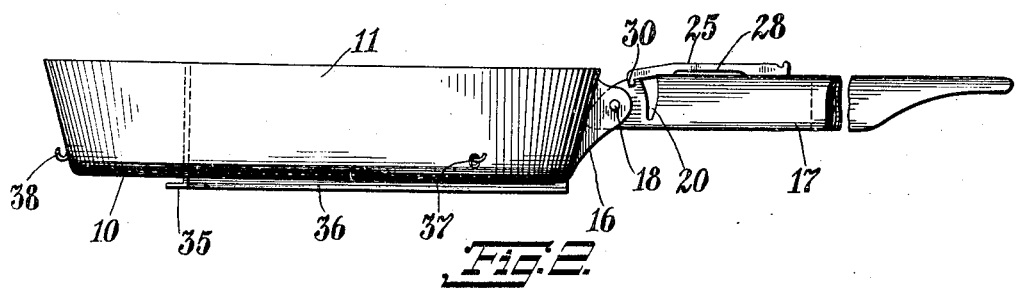
Fig. 2 is a side view.
Figure 3:
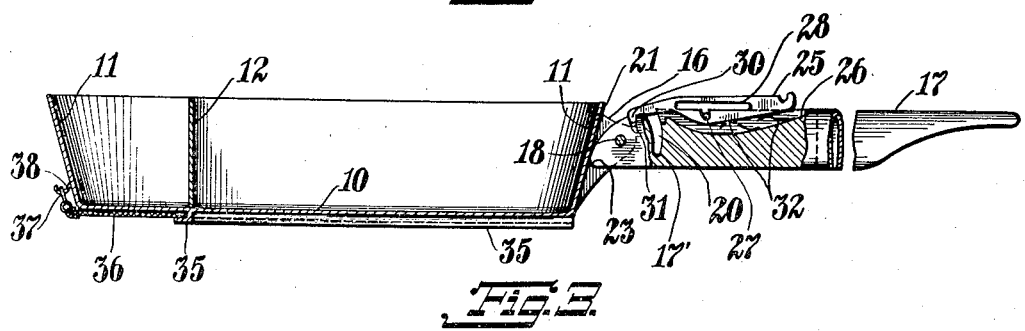
Fig. 3 is a longitudinal sectional view taken on the line 3—3 of Fig. 1.

As here shown my improved pan comprises a circular bottom member 10 and a peripheral flange 11. In order to enable the pan to be used in cooking a variety of foods at the same time, I provide therein the three vertical partitions 12 which collectively considered are arranged substantially in the form of a triangle, leaving a central space or compartment 13 and three side compartments 14. In cases where the pan is arranged for use in camping I may take the handle thereof arranged to swing or collapse into the body of the pan. As here shown the pan is formed on one side with a pair of ears or lugs 16 between which the end of the handle 17 engages and to which it is pivoted as at 18.

Adjacent its hinge end, and on its top side, the handle is formed with a deep notch or recess 20 which may have one wall thereof inclined in correspondence to the inclination of the peripheral flange 11 of the pan and which is arranged at such distance from the hinge pintle 18 of the handle as to register with and receive the said flange when the handle is swung over into the pan, a shallow notch 21 being here shown as formed in the said flange to receive the neck portion 17' of the handle adjacent the recess 20. The handle is held against outward swinging movement beyond the proper position by means of a nose 23 thereon which bears on the flange 11. In order to reduce the strain on this neck portion 17' when the pan is being handled I provide a latch in the form of a bar 25 which extends along a longitudinal groove 26 in the top of the handle and which is connected thereto by means of a pin 27 fixed in the handle which extends through a longitudinal slot 28 in the said bar this slot having a short lateral offset at one end in which the pin normally engages. Upon the end of this bar adjacent the hinge end of the handle, which end of the bar extends across the recess 20 is a hook 30 which is adapted to engage in a keeper notch 31 in the top side of the handle adjacent the recess 20. A pair of springs 32 are located in the groove and bear upward on the bar and retain the hook 30 in engagement with the notch 31 and the pin 27 in the offset from the slot 28. When the pan is not in use the handle may be swung forward into the pan, the handle being accommodated between two of the partition elements 12. To release the latch 25 and uncover the recess 20 the latch may be first pressed downward, by pressure applied to its middle portion, to bring the pin 27 in registry with the longitudinal portion of the slot 28 in the latch, and then the latch is pressed downward at its rear end freeing the hook 30 on its front end from the notch 31 and the latch is finally drawn back to cause the recess 20 to be uncovered.

In order to enable food in the side compartments of the pan to be kept at less than a cooking temperature I may form on the underside of the pan beneath the partitions the channeled members 35 which may receive the edges of suitably shaped removable asbestos pads such as 36. These pads having rings 37 attached to their outer edges to engage hooks 38 on the flange 11 of the pan and retain the pads in position.

While I have illustrated and described a preferred embodiment of my invention, it will be understood that I do not limit myself to the precise construction herein shown, and that various changes and modifications might be made therein without departing from the spirit and scope of the invention as defined in the appended claims.

Having thus described my invention, what I claim as new and desire to protect by Letters Patent of the United States is as follows:—

1. In a cooking pan, a pan body formed with a peripheral flange, a handle hinged thereto and provided with a recess on its top side which receives the flange on the pan body when the handle is swung into the pan, and a latch carried by the said handle and normally projecting across the said recess and holding the edge walls thereof against movement away from one another, said latch being movable away from position projecting across the said recess to permit of the said flange of the pan entering the recess.

2. In a cooking pan, a pan body formed with a peripheral flange, a handle hinged thereto and provided with a recess on its top side which receives the flange on the pan body when the handle is swung into the pan, and a latch carried by the said handle and normally projecting across the said recess and holding the edge walls thereof against movement away from one another, a hook on the end of the latch engaging in a keeper notch in the handle, and means mounting said latch on said handle in a manner, to permit of swinging movement of the hook out of said notch, and bodily movement of the latch away from position extending across said recess.

3. In a cooking pan, a pan body formed with a peripheral flange, a handle hinged thereto and provided with a recess on its top side which receives the flange on the pan body when the handle is swung into the pan, a latch carried by said handle and normally projecting across the said recess and holding the edge walls thereof against movement away from one another, a hook on the end of the latch engaging in a keeper notch in the handle, said latch being in the form of a flat bar positioned in a longitudinal groove in the said handle, said bar being formed with a longitudinal slot having an offset notch in one wall thereof, a pin fixed in the handle and normally engaged in said notch, and a spring located in the said groove and bearing on the said latch bar to yieldingly retain the said latter in position with the said pin engaged in the said notch in the bar and the said hook on the end of the latch bar engaged with the keeper notch in the handle.

In testimony whereof I have affixed my signature.

ANTONIO SALUCCI.